United States Patent [19]

Voll et al.

[11] 3,916,679

[45] Nov. 4, 1975

[54] APPARATUS FOR DETERMINING THE PROPERTIES OF SUPERPLASTIC MATERIALS

[75] Inventors: Hubert Paul Voll, Ougree; Albano Piccinin, Liege, both of Belgium

[73] Assignee: Centre de Recherches Metallurgiques-Centrum Voor Research in de Metallurgie, Brussels, Belgium

[22] Filed: May 21, 1974

[21] Appl. No.: 471,920

[30] Foreign Application Priority Data
May 24, 1973 Belgium .............................. 800014

[52] U.S. Cl. .................................................. 73/95
[51] Int. Cl.² ........................................... G01N 3/32
[58] Field of Search .................................. 73/89, 95

[56] References Cited
UNITED STATES PATENTS
3,733,049   5/1973   van den Hove et al. ................ 73/95

*Primary Examiner*—Jerry W. Myracle
*Attorney, Agent, or Firm*—Holman & Stern

[57] ABSTRACT

The apparatus includes a machine for subjecting a test-piece to a tensile test using a mobile member entraining one end of the test-piece and exerting traction on the test-piece. The mobile member is subjected to controlled displacements. The force applied to the test-piece and its length are measured as a function of time.

1 Claim, 6 Drawing Figures

APPARATUS FOR DETERMINING THE PROPERTIES OF SUPERPLASTIC MATERIALS

The present invention relates to apparatus for determining the properties of superplastic materials by using a vertical or horizontal tensile testing machine, preferably computer-controlled.

Materials known as superplastic have been known for a long time. Rosenhain had observed in 1920 that, after laminating, a ternary zinc-copper-aluminum alloy behaved differently from other metallic materials and its ductility was similar to that of glass in the fluidity zone. In 1924, Sauveur noticed that iron rods subjected to twist and placed in a thermal gradient twisted more readily in the zone where the temperature was equal to the transition temperature of the iron. This meant that two types of materials with superplastic characteristics had been discovered: finely grained (about a micrometer) superplastic materials and materials whose ductility increased during phase transformation.

However, it is only within the last few years that the interest shown by metallurgists in metallic materials with superplastic characteristics has markedly increased. These materials, in their superplasticity zone, can undergo high levels of strain, which can reach 2000% at fracture, when acted upon by relatively low stresses.

To satisfy the requirements of metallurgists efforts have been made to solve the problem of determining the properties of the materials in question, mainly using the tensile test.

Figure 1A:
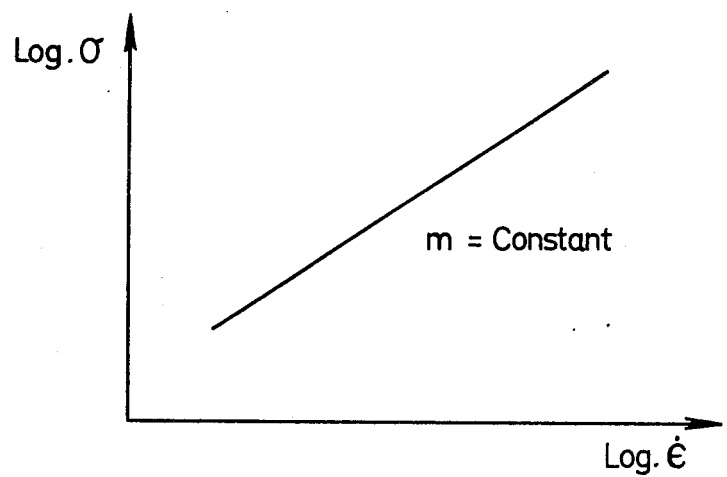
FIG. 1a and 1b are log-log graphs of stress against strain rate.

A plastically stressed material can behave in one of the following ways during the tensile test:

1. fracture after very slight elongation,
2. initial homogeneous strain shown by a regular reduction in cross-section at the start of the test followed by a zone of high reduction of area (striction) and then fracture after elongation of 10s of %,
3. the same procedure as (2), except that the elongation at fracture can reach 100 to 200%,
4. virtually homogeneous strain, and fracture at 1000 to 2000% elongation.

A superplastic material behaves in the same way as (4).

Superplasticity is a phenomenon in the field of ductility which is the ability to tolerate high homogeneous plastic strains when stressed.

More exactly, superplastic materials, when strained under particular temperature conditions, undergo homogeneous elongations far greater than those achieved with normal plastic materials.

Theoretically, the possibility of homogenous strain of a metal is normally linked to the value of the work-hardening coefficient $n$ using the equation $\sigma = k \cdot \epsilon^n$ with $0 < n < 1$.

in which
  $\sigma$ is the rational stress
  $\epsilon$ the rational strain
  $k$ is a constant dependent on the type of material.

It has been established that homogeneous plastic strain is greatest when the coefficient $n$ approaches unity.

It is noted that for superplastic materials the value of their work-hardening coefficient is not about 1 but is on the contrary much smaller than that of ordinary materials.

To establish the homogeneous plastic strain zone of this type of material more accurately, a law
$$\sigma = K \cdot \dot{\epsilon}^m$$
is used,
in which
  $\dot{\epsilon}$ is the rational strain rate
  $m$ is a coefficient measuring the sensitivity of stress to the strain rate $$\left( m = \frac{d \log \sigma}{d \log \dot{\epsilon}} \right)$$

$K$ is a constant dependent on the type of material and is always defined by the rational unit strain rate.

It has also been shown that the homogeneous strain is always greatest when the coefficient $(m)$ is maximum and, at the limit, equal to unity.

Mechanical tests which make it possible to determine the values of coefficients $(m)$ and $(k)$ are hot tensile tests with variation, in stages, of the cross-piece displacement speed.

If the hot tensile test is compared with a conventional plasticity tensile test, the hot tensile test shows the following facts:

the coefficient $(m)$ of sensitivity to the strain rate influences the start of reduction of area. When this has started its progress is also a function of the value of coefficient $(m)$.

The reduction of area for a plastic material starts when rational strain $(\epsilon)$ becomes equal to the work-hardening coefficient $(n)$.

This is completely different for superplastic materials.

The assumption in the present case is that reduction in area starts when the load is at a maximum, this is shown by the particular expression according to equation (2):
$$\delta_{max, i} = K \cdot \dot{\epsilon}_i^m.$$

This equation, in logarithmic coordinates (log $\sigma$, log $\dot{\epsilon}$), is:
$$\log \sigma_{max, i} = \log K + m \log \dot{\epsilon}_i,$$
i.e. a straight line whose coefficient $$\left( m = \frac{d \log \sigma_{max, i}}{d \log \dot{\epsilon}_i} \right)$$

is the gradient and whose ordinate at the origin is the coefficient log K.

Figure 1B:
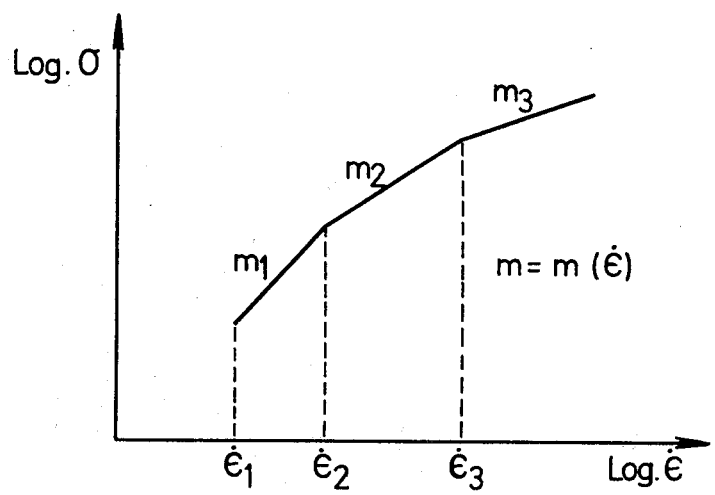

When the coefficient variations in the intended range of speeds are small enough for $(m)$ to be considered constant, the result is a single straight line for the whole tensile test (FIG. 1a); on the other hand, when the coefficient $(m)$ variations are larger, the result is several sections in the straight line which form a broken line and there is a separate coefficient $(m)$ value corresponding to each of the line sections (FIG. 1b).

In the hot tensile test to be performed to determine factors $(m)$ and $(K)$ it is essential to achieve a state of strain such that the rational strain rate $(\dot{\epsilon})$ and the rational stress $(\sigma)$ are homogeneous throughout the length of the test-piece.

In order to be able to measure ($\dot\epsilon$) according to the formula $$\dot\epsilon = \frac{V}{\rho},$$

two parameters must be available: the length ($l$) at any time of the gauge portion of the test-piece and its rate of extension ($V$). However, these two parameters are affected by deformation of the tensile testing machine. But the strain rate of the machine is zero when the load is invariable or if the load reaches a maximum. Therefore, the extension rate of the test-piece equals the applied strain rate at this precise moment. Deformation of the machine has been found to be negligible in the range of forces required to strain the test-pieces.

On the basis of these factors the Applicant has developed the apparatus according to the present invention; the apparatus is designed to carry out the following operations:

establishing the different values ($V_i$) of the strain rate prior to the tensile test;

operate the tensile testing machine at the speed ($V_1$) and continuous calculation of the value of the load (P):

$$P = \frac{F}{S_0}$$

in which F is the load applied to the test-piece at any time $S_0$ is the initial cross-section of the test piece;

comparison of the calculated load (P) value with the maximum value of the load, i.e. ($P_{max,\,1}$), which is initially zero, and assimilation of the calculated value (P) with ($P_{max,\,1}$) when (P) increases;

recording of the (P) value when the latter ceases to rise ($\Delta P = O$), becomes ($P_{max,\,1}$) occurs at this point;

conversion of this maximum value ($P_{max,\,1}$) of the load (P) to the maximum value ($\sigma_{max,\,1}$) of the rational stress ($\delta$) given by the equation $\sigma = P (1 + A)$ in which A is the relative elongation of the test-piece, at ($P_{max,\,1}$), i.e.

$$A = \frac{\rho - \rho_0}{\rho_0},$$

($\rho$) being the length at any time of the gauge portion of the test-piece and ($\rho_0$) the initial length of the gauge portion;

calculation of the rational strain rate ($\dot\epsilon_1$) using the equation $$\dot\epsilon_1 = \frac{V_1}{\rho},$$

changing the traction speed which passes from $V_1$ to $V_2$ then to $V_3, \ldots, V_n$, while carrying out the same operations for each value ($V_i$) of the said speed;

after completion of the tensile tests, entering the $n$ values of ($\sigma_{max,\,i}$) and ($\dot\epsilon_i$) obtained in a logarithmic diagram (log$\sigma_{max,\,i}$, log $\dot\epsilon_i$) and, by applying the principle of least squares, establishing a straight line whose equation is:

$\log\sigma_{max,\,i} = \log K + m \times \log \dot\epsilon_i$;

only the gradient needs to be measured to establish the coefficient $$\left(m = \frac{d \log \sigma_{max,\,i}}{d \log \dot\epsilon_i}\right)$$

and only the ordinate at the origin needs to be measured to establish the log of the coefficient (K).

Figure 2B:
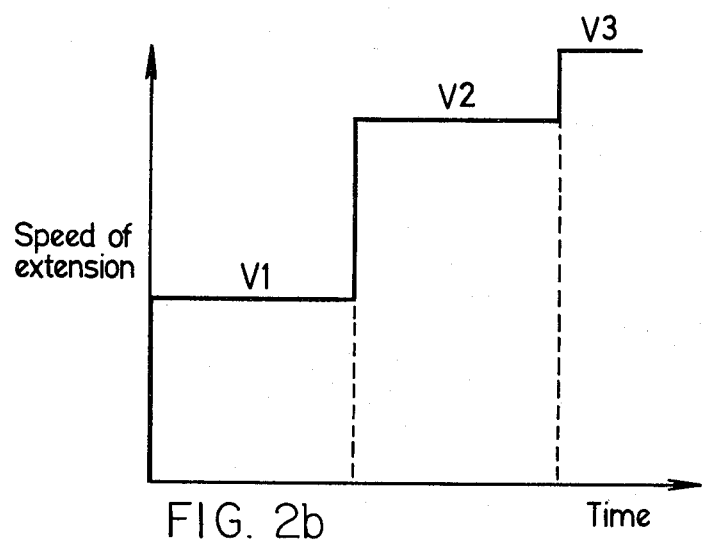
FIGS. 2a and 2b shows two related graphs, one of extension speed against time, the other of load against time.
Figure 2A:
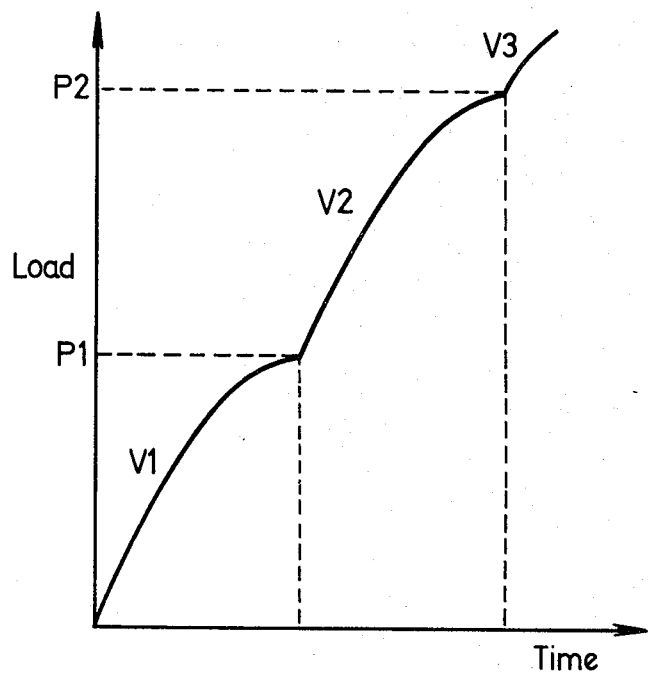

The traction speed is modified as a function of the chosen values of this speed as shown in the attached FIG. 2, i.e. the mobile cross-piece of the tensile testing machine is displaced at a speed ($V_1$) thereby progressively increasing the load (P) up to a maximum value ($P_1$) thus reaching the moment to change the cross-piece displacement speed ($V_1$) to a speed ($V_2$) which causes the load (P) to start to rise again from ($P_1$) to a second maximum value ($P_2$) which thus fixes the moment to change the speed ($V_2$) to a speed ($V_3$) and so on.

FIG. 2 is obviously shown by way of non-limitative example. The increasing speeds have been shown as ($V_1 < V_2 < V_3$) but the higher or lower speeds ($V_i$) can be arranged in any desired chronological order ($V_1 < V_2 > V_3$, $V_1 > V_2 < V_3$, etc.).

When the coefficient ($m$) cannot be considered as constant within the intended range of speeds, the apparatus according to the invention should be equipped with means to correlate the value of the coefficient ($m$) to that of the gradient of the section of the straight line connecting two consecutive points in the diagram (log $\sigma$, log $\dot\epsilon$), the means further make it possible to correlate the coefficient ($m$) value discovered to the lowest rational strain rate ($\dot\epsilon$) and to establish the law of coefficient ($m$) variation as a function of the said rational strain rate ($\dot\epsilon$) on the basis of the differents pairs of values resulting from this correlation.

Knowing this law makes it possible to determine the optimum strain rate to be adopted for the material in question, i.e. the maximum strain rate compatible with homogeneous strain throughout the length of the test-piece It is well known that the exponential law $\sigma = K\dot\epsilon^m$ can be linearly shown using logarithms to any base (log), but decimal ($\log_{10}$) or napierian logs (ln) are preferable.

The apparatus according to the invention makes it possible to feed different values ($V_i$) of the traction speed into a computer programmed to automatically start the tensile testing machine to calculate the load $$P = \frac{F}{S_0},$$

to compare the calculated (P) values to establish ($P_{max,\,i}$), to convert the maximum value ($P_{max,\,i}$) to ($\sigma_{max,\,i}$) and to calculate the rational strain rate ($\dot\epsilon i$).

Having described the principles used to obtain the desired results, the apparatus which carries out the abovementioned operations and which efficiently obtains the said results, will now be described.

The apparatus of the present invention comprises:

a machine for subjecting a suitable test-piece to a tensile test using a mobile member, such as a cross-piece, entraining one of the ends of the test-piece, exerting traction on the test piece;

means for subjecting the said member to one or a plurality of (successive) displacements, the speeds and durations of which are controlled;

means for measuring the force applied to the test-piece as a function of time at any moment during the test;

means for measuring the length of the test-piece as a function of time at any moment during the test.

An advantageous embodiment of the apparatus comprises a computer which:
a. immediately processes the data suppplied by the above mentioned measuring means, in accordance with the information in the specification and particularly in accordance with the formulae,
b. programs the movement of the mobile member in accordance with the information in the specification,
c. supplies the required results, i.e. the m and K values, in digital or analog form.

This embodiment not only ensures continuous measurement of the parameters used to establish the $m$ and K coefficients, but also ensures immediate and continuous calculation of these coefficients and tracing of the curves of the results obtained.

Figure 3:
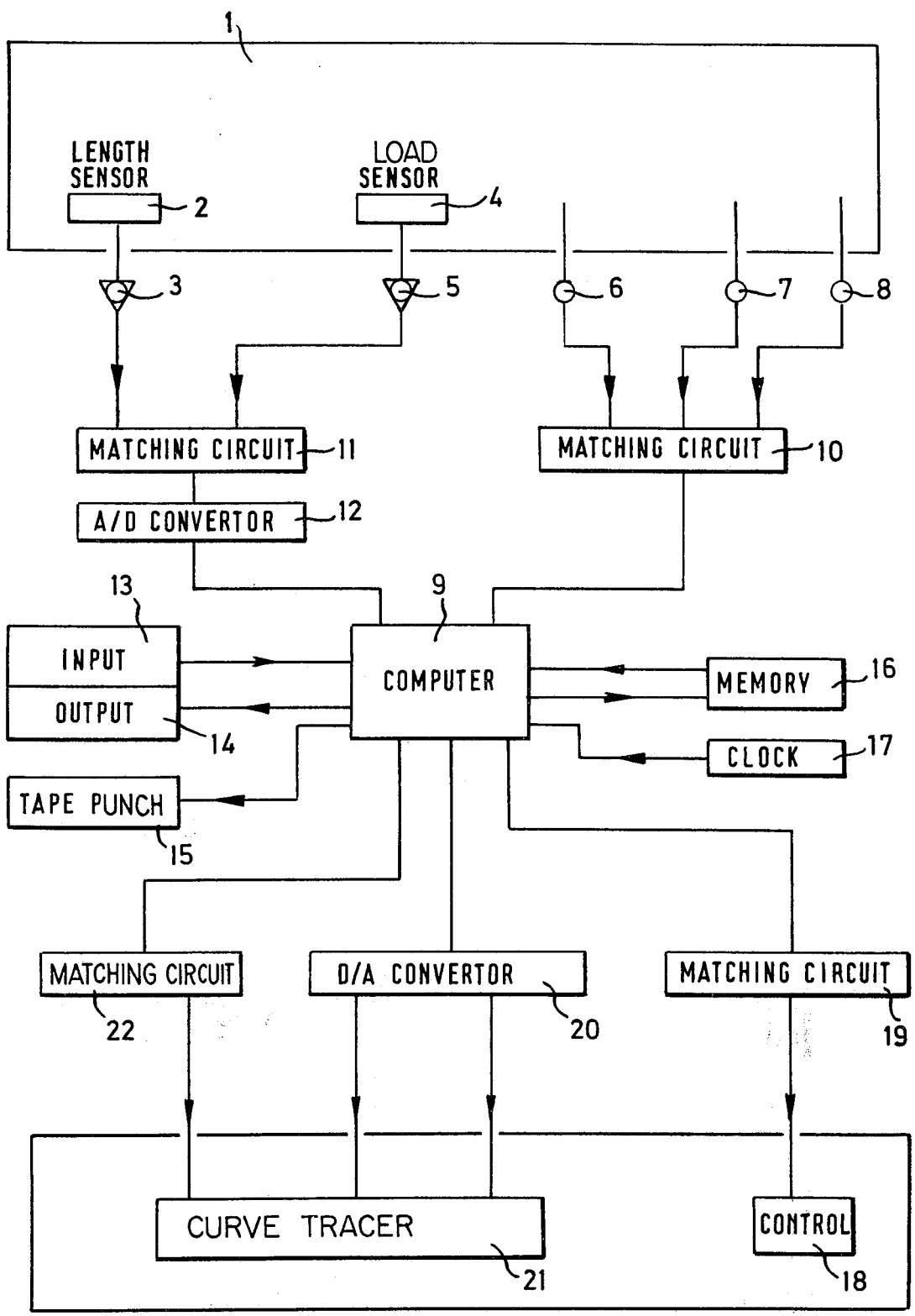
FIG. 3 is a block diagram of tensile testing apparatus.

A preferred embodiment of the apparatus comprises (see attached FIG. 3):

a sensor 2 which measures the length of the test-piece during the test;

an amplifier 3 which amplifies the signal emitted by the sensor 2;

a sensor 4 which measures the load applied to the test-piece;

a variable gain amplifier 5 which amplifies the signal emitted by the sensor 4;

a deviation calibration and correction device with control buttons 6;

a speed selector 7 (providing nine speeds, for example) for the mobile cross-piece;

a member 8 which shows the stop position or direction of movement of the cross-piece;

three matching circuits 10, 11 19;

an analog/digital (A/D) converter 12;

a digital/analog (D/A) converter 20;

a central computer unit 9;

a data printer 13;

a result printer 14;

a tape punch 15;

a memory 16;

a real time graduated clock 17;

a control circuit 18 which controls the movements of the mobile cross-piece;

the whole assembly has the following electrical connections:
a) 2 - 3 - 11 - 12 - 9
b) 4 - 5 - 11 - 12 - 9
c) 6 - 10 - 9
d) 7 - 10 - 9
e) 8 - 10 - 9
f) 13 - 9
g) 14 - 9
h) 15 - 9; 16 - 9; 17 - 9
i) 20 - 9
j) 18 - 19,-9 which allow a and b : the supply of the signals from the two sensors into the central unit 9,
c : checking and correction of the deviation of sensor 4 and its amplifier 5,
d : control of the position and regulation of the speed selector,
e : control of the cross-piece situation,
f and g : inputting of data and reception of the test results,
h : outputting the results on tape, "memory - central unit" link, time keeping,
i : printing the results in analog form,
j : control of the movements and stopping of the cross-piece from the central unit, in accordance with the program fed into it.

The apparatus operates as follows: the test-piece is fitted into the tensile testing machine 1. The computer unit 9 is fed with data including the cell calibration signal, before the test (from the printer 13). Using the member 8 the operator orders the computer to start the motion of the cross-piece; the computer verifies that all the data (for example the different cross-piece speeds) have been fed in and then uses the control circuit 18 to start the test. During the test the measured parameters (length of the test-piece, load applied, speed of cross-piece) are continuously recorded and calculations which establish the coefficients $m$ and K are made as shown in the specification, particularly the equations therein. The cross-piece changes from one speed to another at the moment when the load on the test-piece reaches a maximum, this is effected using the selector 7 controlled by the central unit. The end of the test is detected using a predetermined stop parameter. The printer 14 then supplies the test results, their representative curves are obtained using 20 - 21 - 22.

Example:

The test below, given by way of non-limitative example, was carried out on a test-piece made of Zn - 22% Al, tested in the zone of superplasticity.

The initial test-piece dimensions were as follows:

| | |
|---|---|
| length: | 26 mm |
| width: | 7 mm |
| thickness: | 1.32 mm. |

The test-piece was strained according a sequence of increasing speeds. The rational stress ($\sigma_i$) and the rational strain rate ($\dot{\epsilon}_i$) values were established when the load (F) value applied to the test-piece was at a maximum. The pairs of values ($\Gamma_i$, $\dot{\epsilon}_i$) were then converted to decimal logs.

The following table shows the stages in the calculation carried out using the following formulae:

$$\sigma_{max, i} = \frac{F_i}{S_0} \cdot (1 + A_i) = \frac{F_i}{S_0} \times \frac{\rho_i}{\rho_0}$$

$$\dot{\epsilon} = \frac{V_i}{\rho_i}$$

| V mm/min | $\rho_i$ mm | $\dot{\epsilon}_i$ min$^{-1}$ | $\log_{10} \dot{\epsilon}_i$ | $F_i$ kg | $\sigma_i$ kg/mm² | $\log_{10} \sigma_i$ |
|---|---|---|---|---|---|---|
| 1 | 27.5 | 0.0364 | $\overline{2}$.562 | 4.4 | 0.505 | 1.704 |
| 2 | 28.0 | 0.0715 | $\overline{2}$.854 | 5.6 | 0.653 | 1.815 |
| 5 | 28.5 | 0.175 | $\overline{1}$.243 | 7.9 | 0.94 | 1.974 |

-continued

| V mm/min | $\rho_i$ mm | $\dot{\epsilon}_i$ min$^{-1}$ | $\log_{10} \dot{\epsilon}_i$ | $F_i$ kg | $\sigma_i$ kg/mm$^2$ | $\log_{10} \sigma_i$ |
|---|---|---|---|---|---|---|
| 10 | 29.0 | 0.345 | $\bar{1}$.538 | 10.1 | 1.22 | 0.086 |
| 20 | 30 | 0.666 | $\bar{1}$.824 | 13 | 1.622 | 0.21 |
| 50 | 32 | 1.56 | 0.193 | 18 | 2.40 | 0.38 |

Figure 4:
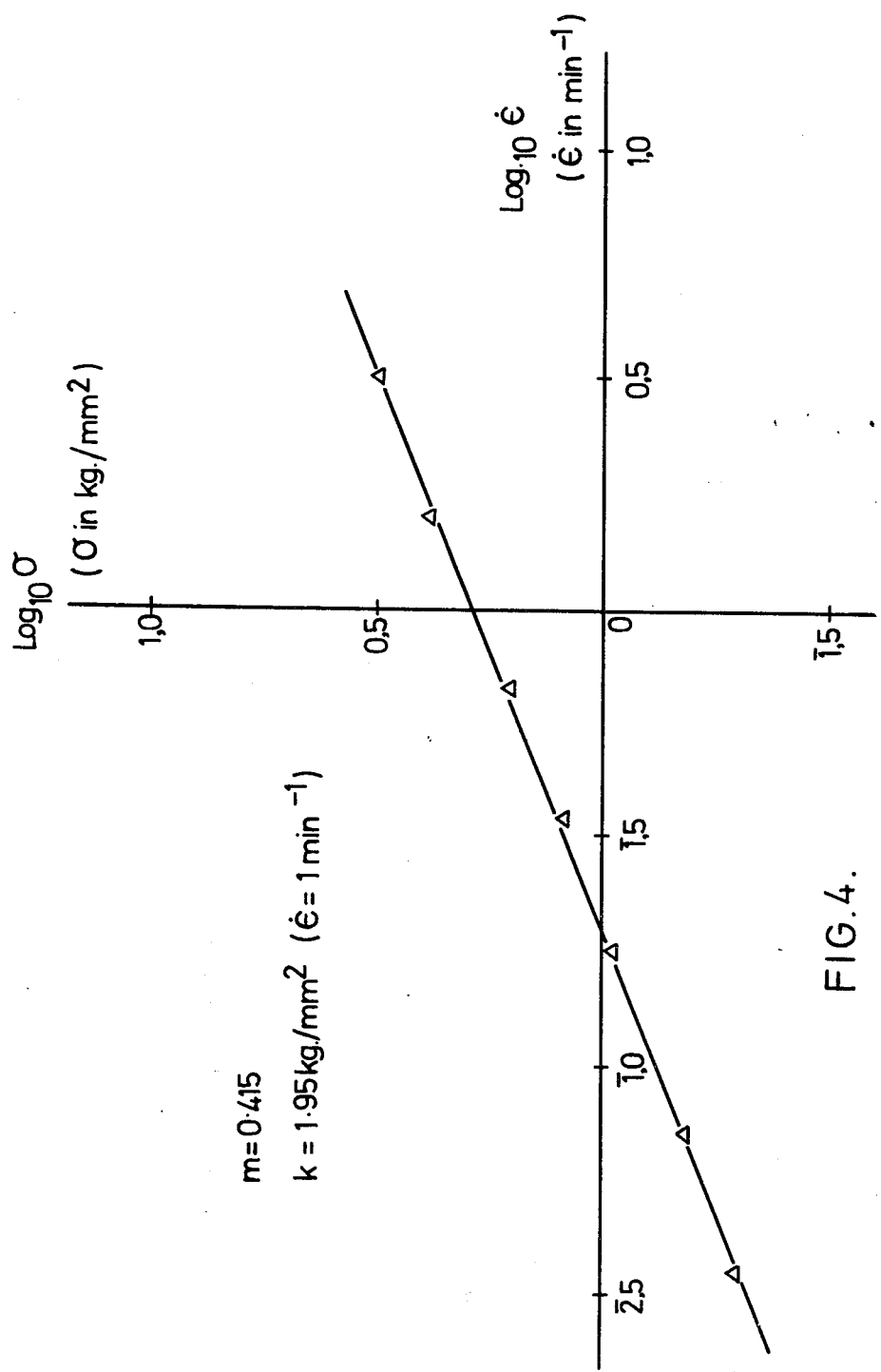
FIG. 4 is a log-log graph of stress against strain rate.

The pairs of values $\log_{10} \dot{\epsilon}_i$ and $\log_{10} \sigma_i$ were plotted and the gradient and ordinate at the origin of the median line (FIG. 4) were determined.

It was found that in this particular case:
$m = 0.415$
$K = 1.95$ kg/mm$^2$ at $\dot{\epsilon} = 1$ min$^{-1}$.

It should be noted that the superplastic behavior established using the above method relates not only to non-ferrous metals but also to ferrous metals, particularly steel.

We claim:

1. A method of determining for a superplastic material, the coefficients $m$ and $K$ in the equation $\sigma = K \cdot \dot{\epsilon}^m$, where $\sigma$ is the stress on a test-piece of the material subjected to a rate of strain $\dot{\epsilon}$, the method comprising the steps of
   a. subjecting a test-piece of the superplastic material to a tensile test by means of a tensile testing machine;
   b. operating the tensile testing machine at a given traction speed $V_1$;
   c. continually measuring the length, $\rho$, of the gauge portion of the test piece;
   d. continually measuring the force F to which the test-piece is subjected;
   e. calculating the load $P = F/S_o$, where $S_o$ is the initial cross-sectional area of the test-piece;
   f. comparing each value of P with the highest preceding value, and recording P when it ceases to rise this value, $P_{max,1}$, thus being a maximum;
   g. calculating the rational stress $\sigma_{max,1}$ corresponding to $P_{max,1}$;
   h. calculating the rational strain rate $\Gamma_1 = V_1/\sigma$ corresponding to $\dot{\sigma}_{max,1}$;
   i. changing the traction speed to $Vi$;
   j. repeating steps (c) to (i) to obtain pairs of values $\sigma_{max,i}$ and $\dot{\epsilon}_i$;
   k. plotting log $\sigma_{max,i}$ against log $\dot{\epsilon}_i$ and fitting the straight line log $\sigma_{max,i} = \log K + m \log \dot{\epsilon}_i$; and
   l. determining log K and $m$ from the straight line.

* * * * *